United States
Buchroeder 4,070,098
Jan. 24, 1978

[54] FISHEYE PROJECTION LENS SYSTEM FOR 35MM MOTION PICTURES

[75] Inventor: Richard A. Buchroeder, Tucson, Ariz.

[73] Assignee: The University of Arizona Foundation, Tucson, Ariz.

[21] Appl. No.: 681,117

[22] Filed: Apr. 28, 1976

[51] Int. Cl.$^2$ .............. G02B 13/06; G02B 9/64; G03B 37/00; G03C 1/76

[52] U.S. Cl. .................... 350/198; 350/214; 352/69; 352/239

[58] Field of Search ............ 350/198, 214; 35/45; 352/69, 239

[56] References Cited
U.S. PATENT DOCUMENTS 3,366,436  1/1968  Rickless ..................... 350/214

*Primary Examiner*—Conrad J. Clark
*Attorney, Agent, or Firm*—Mason, Kolehmainen, Rathburn & Wyss

[57] ABSTRACT

A 180° high resolution fisheye projection lens suitable for projecting images onto a hemispherical dome, such as a planetarium dome, includes a nine-element projection lens and a six-element relay lens. The relay lens serves to increase the distance between the film plane and the lens and eliminates the need for modifying the projector to provide clearance between the lens and the projector shutter mechanism. In addition, the relay lens may be modified to make the fisheye lens compatible with various film sizes without modifying the fisheye lens. A focused iris is used to mask portions of the projected image, and a nonuniformly acting fader is used to reduce back scatter and to stop down the lens to adjust the brightness of the projected image.

10 Claims, 13 Drawing Figures

| ELEMENT | $n_d$ | $\nu_d$ | RADIUS | THICKNESS | SEPARATION |
|---|---|---|---|---|---|
| I | 1.607 | 56.7 | $R_1 = 8.853$<br>$R_2 = 1.181$ | $t_1 = .220$ | |
| | | | | | $S_1 = 1.037$ |
| II | 1.607 | 56.7 | $R_3 = 4.463$<br>$R_4 = 1.181$ | $t_2 = .150$ | |
| | | | | | $S_2 = 1.486$ |
| III | 1.620 | 36.4 | $R_5 = 5.798$<br>$R_6 = 3.308$ | $t_3 = .300$ | $S_3 = .492$<br>$S_4 = .570$ |
| IV | 1.620 | 36.4 | $R_7 = 6.869$<br>$R_8 = 2.536$ | $t_4 = .150$ | $S_5 = .100$ |
| V | 1.607 | 56.7 | $R_9 = 2.018$<br>$R_{10} = 2.638$ | $t_5 = .500$ | $S_6 = .100$ |
| VI | 1.607 | 56.7 | $R_{11} = 6.440$<br>$R_{12} = 1.309$ | $t_6 = .550$ | $S_7 = .100$ |
| VII | 1.755 | 27.6 | $R_{13} = 1.113$<br>$R_{14} = 4.728$ | $t_7 = .150$ | $S_8 = 2.409$ |
| VIII | 1.607 | 56.7 | $R_{15} = $ PLANO<br>$R_{16} = 5.002$<br>$K = -7.32$ | $t_8 = .750$ | $S_9 = .276$<br>$S_{10} = .977$ |
| IX | 1.620 | 36.4 | $R_{17} = 5.002$<br>$R_{18} = $ PLANO | $t_9 = .750$ | $\ell = 18.276$ |

| ELEMENT | $n_d$ | $\nu_d$ | RADIUS | THICKNESS | SEPARATION |
|---|---|---|---|---|---|
| | | | | | $S_{11} = 1.811$ |
| X | 1.607 | 56.7 | $R_{19} = 2.127$<br>$R_{20} = 35.712$ | $t_{10} = .6450$ | |
| | | | | | $S_{12} = .008$ |
| XI | 1.607 | 56.7 | $R_{21} = 1.909$<br>$R_{22} = 4.288$ | $t_{11} = .6648$ | |
| | | | | | $S_{13} = .140$ |
| XII | 1.755 | 27.6 | $R_{23} = 13.018$<br>$R_{24} = 1.212$ | $t_{12} = .1400$ | |
| | | | | | $S_{14} = 1.066$ |
| XIII | 1.620 | 36.4 | $R_{25} = 1.212$<br>$R_{26} = 2.071$ | $t_{13} = .1400$ | |
| | | | | | $S_{15} = .070$ |
| XIV | 1.607 | 56.7 | $R_{27} = 4.809$<br>$R_{28} = 1.997$ | $t_{14} = .6066$ | |
| | | | | | $S_{16} = .144$ |
| XV | 1.607 | 56.7 | $R_{29} = 5.718$<br>$R_{30} = 5.718$ | $t_{15} = .5450$ | |
| | | | | | $S_{17} = 3.169$ |

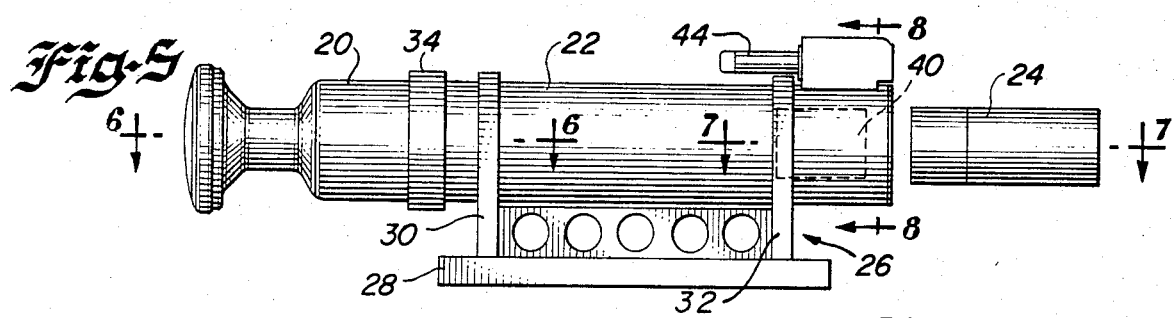
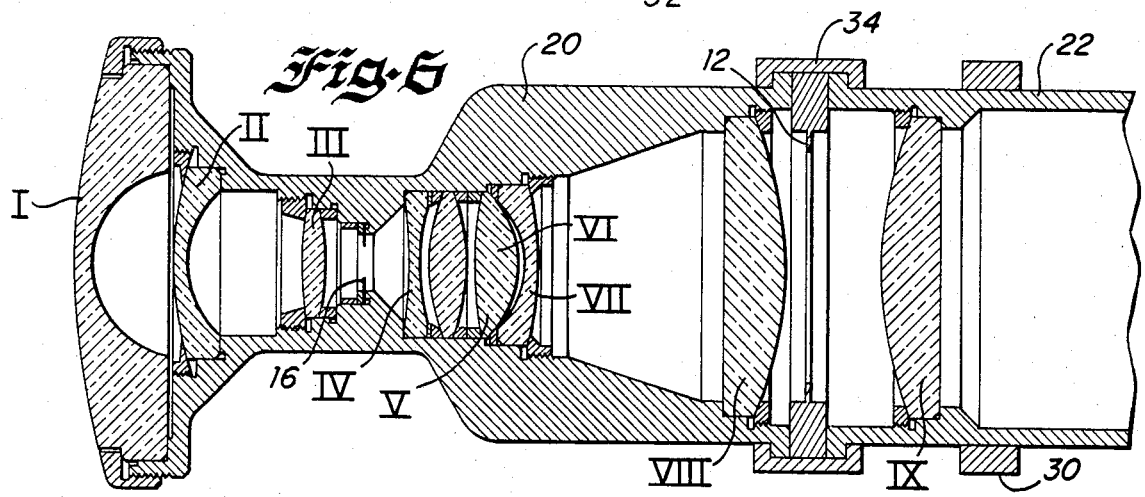
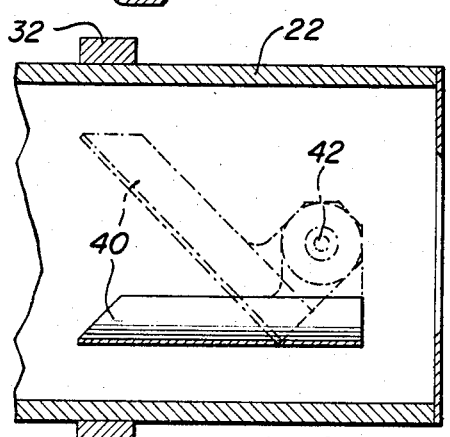
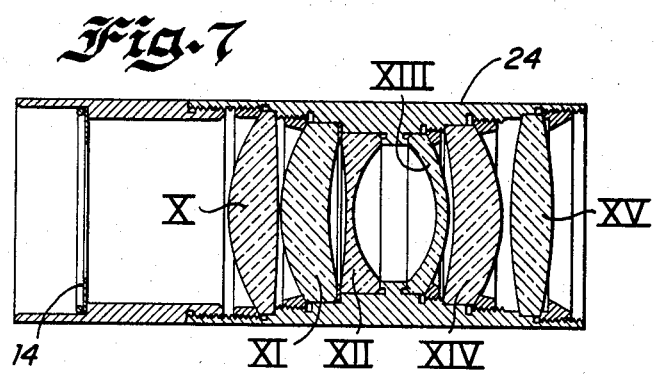
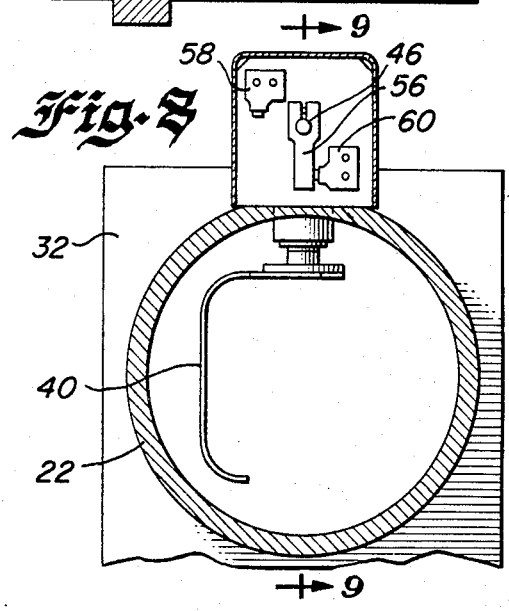
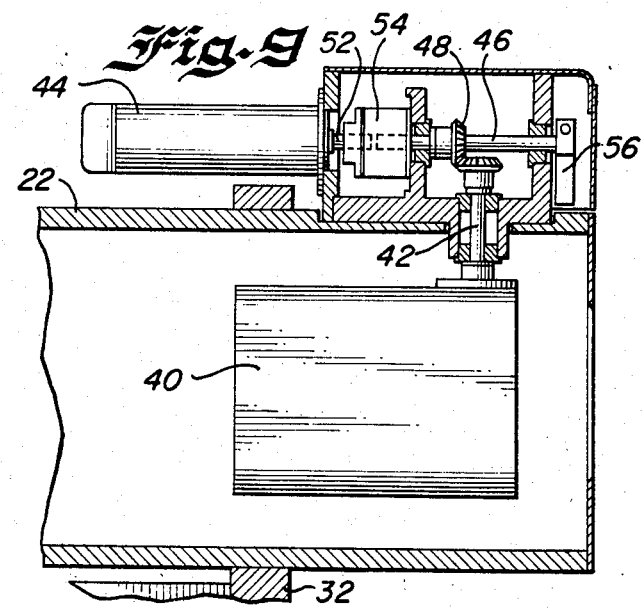

FISHEYE PROJECTION LENS SYSTEM FOR 35MM MOTION PICTURES

BACKGROUND OF THE INVENTION

A. Field of the Invention

The present invention relates to wide angle lenses, and more particularly, to high resolution 180° angle projection lenses.

B. Description of the Prior Art

Although wide angle lenses are known, difficulties are encountered when attempts are made to build so-called fisheye lenses having a 180° projection angle while maintaining high resolution, high lens speed and a sufficiently long back focal length. Thus, conventional wide angle fisheye lenses typically are not suitable for projecting motion pictures, since the short back focal length requires the lens to be placed so close to the film plane that it interferes with the shutter and film advancing mechanism. Furthermore, the lens speed must be high to permit the lens to intercept enough light from the light source within the projector to generate a sufficiently bright projected image. The high speed required to project a bright image tends to reduce lens resolution unless steps are taken to compensate for the resolution loss. Such steps tend to make the lens more complex and costly.

SUMMARY OF THE INVENTION

Accordingly, it is an object of the present invention to provide a wide angle fisheye lens system suitable for image projection.

It is another object of the present invention to provide a relatively simple, high resolution projection lens having a relatively long back focal length.

It is another object of the present invention to provide a wide angle projection lens having good light transmission characteristics and resolution.

Yet another object of the present invention is to provide a 180° projection angle lens that maintains good resolution near the edges of the projection field.

A still further object of the present invention is to provide a projection lens having a focused iris for stopping the field in order to mask a portion of the projected image to achieve special effects.

A still further object of the present invention is to provide a wide angle projection lens having a fader control for selectively varying the brightness of the projected image.

Another object of the present invention is to provide a projection lens suitable for projecting images onto a hemispherical dome.

Yet another object of the present invention is to provide a projection lens system having a nonuniform brightness fader mechanism for reducing the back scattering of light that normally occurs in a hemispherical projection dome.

In accordance with a preferred embodiment of the invention, the lens system comprises a nine-element projection lens optically coupled to a six-element relay lens. The nine-element projection lens is designed to maximize the light transmission characteristics of the lens consistent with good resolution, and the six-element relay lens serves to increase the back focal length of the system to thereby permit an increase in the amount of light intercepted from the light source within the projector, and to provide clearance between the film advancing mechanism of the projector and the lens in order to permit a standard lens mounting to be used.

DESCRIPTION OF THE DRAWINGS

The other objects and advantages of the present invention will be more clearly understood by reference to the following detailed description considered in conjunction with the accompanying drawings wherein:

FIG. 5 is a side view of a lens housing containing the elements shown in FIGS. 1 and 3;

FIG. 6 is a side sectional view taken along line 6—6 of FIG. 5 showing the mounting of the lens elements within the housing;

FIG. 7 is a sectional view taken along line 7—7 of FIG. 5 illustrating the mounting of the relay lens elements within the housing and a leaf-type fader;

FIG. 8 is a sectional view taken along line 8—8 of FIG. 5 showing an end view of the fader illustrated in FIG. 7;

FIG. 9 is a side sectional view taken along line 9—9 of FIG. 8 showing the fader and the mechanism for controlling the fader;

DETAILED DESCRIPTION OF THE INVENTION

Figures 1, 2:
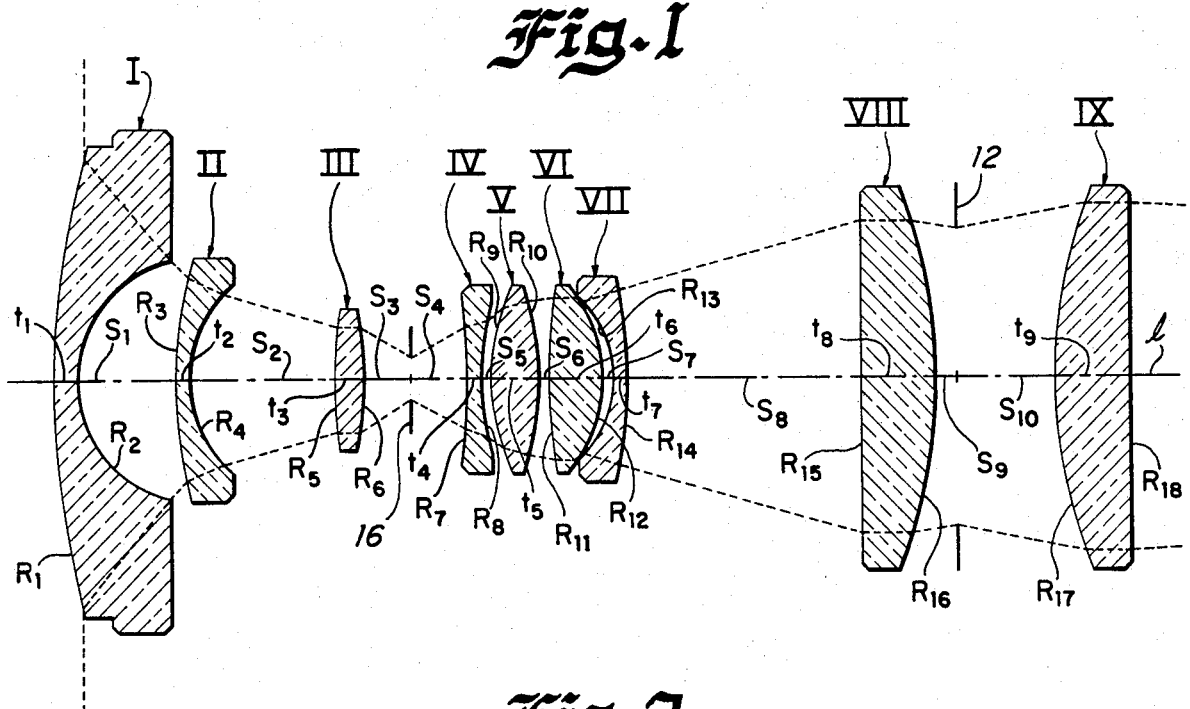
FIG. 1 is a diagram illustrating a nine-element fisheye lens.
FIG. 2 is a table showing the numerical data necessary to construct an 8mm focal length version of the lens illustrated in FIG. 1.
Figures 3, 4:
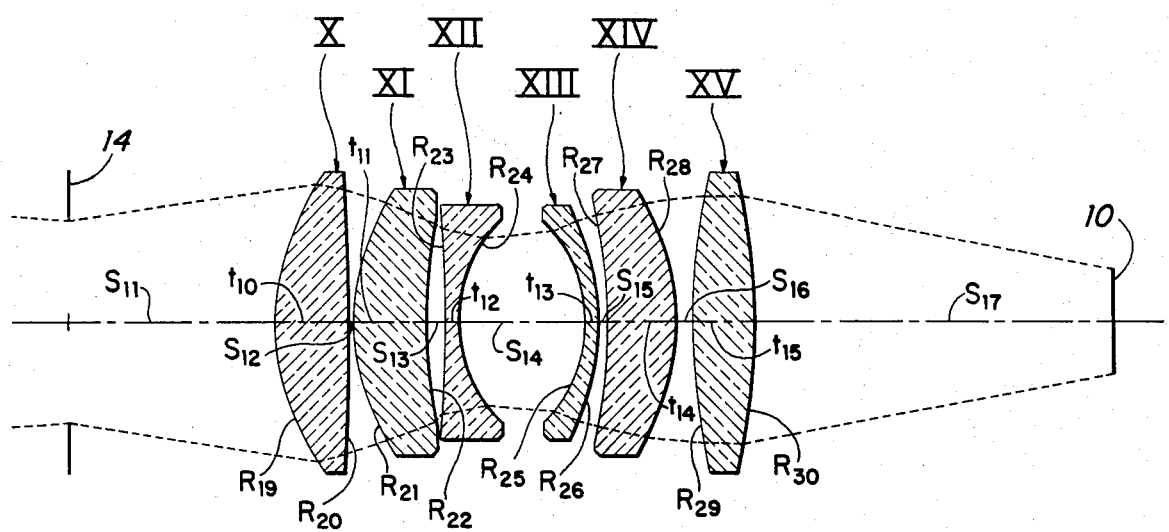
FIG. 3 illustrates a six-element relay lens usable with the fisheye lens illustrated in FIG. 1.
FIG. 4 is a table showing the numerical data necessary to construct the relay lens illustrated in FIG. 3.
Figure 13:
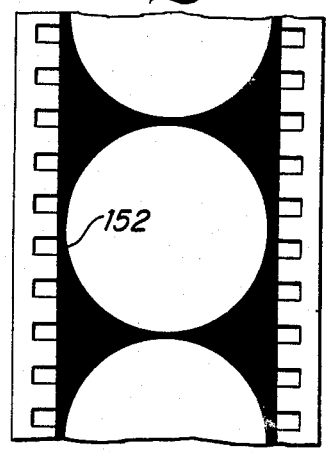
FIG. 13 shows a section of 35mm motion picture film having the frame format modified to accommodate images to be projected by the lens system according to the invention.

Referring now to the drawings, with particular attention to FIGS. 1 and 3, the lens system according to the invention comprises a nine-element projection lens including elements I-IX (FIG. 1) and a six-element relay lens including elements X-XV (FIG. 3). The first seven elements (elements I-VII) could conceivably be used alone as a projection lens; however, the magnification would be too small for 180° projection, the color aberration quality would be imperfect, and the lens speed would be too slow. If the proportions of the lens were changed for the required magnification, the element VII would interfere with the film advancing mechanism of the projector. Consequently, the field lenses (elements VIII and IX) and the relay lens system (elements X-XV) are used to increase the distance between the last element (element XV) and the focal plane 10. The relay lens (elements X-XV) serves as a four-to-one magnifying lens (when the film format illustrated in FIG. 13 is used) to magnify a 23mm diameter image at the focal plane 10 to a 92mm diameter image at the position of the focused iris 12. A focused iris is defined as an iris positioned at one of the focal planes of a lens system. The use of the relay lens to provide a 92mm diameter image at the focused iris 12 increases the flexibility of the system because, when a relay lens is used, various film formats may be accommodated by simply adjusting the magnification factor of the relay lens to produce a 92mm diameter image at the iris 12. Hence, the lens system can be used with various interchangeable relay lenses to accommodate the various film formats. The field lenses VIII and IX converge the light beam originally diverging from the relay lens (element X-XV) permitting smaller lenses to be used in the projection lens (elements I-VII). This permits high resolution and uniform projection brightness. The focused iris 12 is placed between the elements VIII and IX, and an aperture stop 14 is placed between the elements IX and X. A second aperture stop 16 to reduce stray light is placed between elements III and IV in the position where the stop 14 is reimaged.

The specific construction data for the projection lens illustrated in FIG. 1 is shown in FIG. 2. The radius, thickness and separation dimensions are given in inches and are designed to produce a lens system having an overall focal length of 8mm. The aperture stop of the lens system illustrated in FIGS. 1 and 3 is $f/3$. A similar table (FIG. 4) gives the construction details of the relay lens system illustrated in FIG. 3. In both tables, the Roman numerals identify the lens elements in their respective order from the long conjugate (object) side to the short conjugate (film) side; $n_d$ represents the refractive index of each element; $\nu$ is the Abbe dispersion number; $R_1$, $R_2$, etc. represent the radii of the successive refractive surfaces, in order, from the long conjugate side to the short conjugate side; $t_1$ and $S_1$, etc. represent the thicknesses of the lens elements and air spaces, respectively, from the long conjugate side to the short conjugate side, $t_1$ being the thicknesses of the first element I and $S_1$ being the thickness of the first air space between lens elements I and II; and 1 represents the distance between aperture stop 14 and the plano surface $r_{18}$ of the field lens IX. The 18.276 inch figure for the distance $l$ is a nominal figure since the lens system is focused by moving the relay lens (FIG. 3) with respect to the fisheye lens (FIG. 1) to achieve focus. The nominal 18.276 inch figure for 1 corresponds to a long conjugate focal length of approximately 25 feet so that the lens system can project images onto a 50 foot diameter dome. K represents the asphericity constant with which the surface shape of a lens is defined by the equation:

$$Z - \frac{y^2 + (K + 1) Z^2}{2R} = 0$$

where
R is the radius of curvature
Y is the zonal radius of the surface
Z is the axial departure from flatness
In the lens system illustrated in the figures, K equals $-7.32$.

As previously stated, the radius, thickness and separation dimensions have been given for a lens system having a nominal 8mm focal length. These dimensions may be normalized to unity focal length by dividing each of the radius, thickness and separation dimensions by the focal length (adjusted for common units). In the present example, in order to get normalized units, the nominal 8mm focal length would be converted to inches by dividing 8mm by 25.4 and dividing each radius, thickness and separation dimension by the focal length thus converted to inches. The index of refraction and Abbe dispersion numbers would not be changed by the normalization. After normalization, the radius, thickness and separation for a lens of any focal length may be calculated by multiplying each of the normalized radius, thickness and separation dimensions by the desired focal length (in common units). Alternatively, this calculation can be made by taking the ratio of the desired and the 8mm lengths and multiplying the radius, thickness and separation dimensions by this ratio.

The lens system according to the present invention is a 180° projection angle fisheye lens designed for projecting images onto a planetarium dome or the like. In a projection lens, several problems arise that normally do not occur in camera or taking lenses. For example, the lens must be designed to intercept as much light as possible from the projection light source, and from this aspect a relatively long short conjugate, or back focal length is desirable to increase the light transmissive qualities of the lens. In addition, the lens must not be adversely affected by the heat generated by the light source in the projector. Therefore, in accordance with an important aspect of the invention, the lens system has been designed with an air space between each element, and glued or cemented lenses are not used. The housing supporting the lens elements is fabricated from a material, such as stainless steel, having substantially the same coefficient of expansion as the glass forming the lenses to reduce thermal stress.

The mechanical construction of the projection lens system according to the invention is illustrated in FIGS. 5-9. The lens system according to the invention is fabricated in three major sections; a projection lens housing 20, a central tube 22 and a relay lens housing 24. The central tube 22 is supported by a supporting structure 26 having a base 28 and a pair of supporting members 30 and 32. The supporting structure 26 is rigidly attached to the tube 22, and may be rigidly attached to a suitable supporting structure when the lens is in operation. The projection lens housing is also rigidly affixed to the tube 22, for example, by a collar 34. The relay lens 24 is movably attached to the tube 22 to permit the lens system to be focused. The diameter of the housing 24 is selected to fix a standard 35mm motion picture projector (such as a standard Century projector), and is movably received into the lens mounting structure (not shown) of the projector. Consequently, both the projector and the tube 22 may be rigidly attached to a suitable supporting structure and focusing accomplished by axially moving the housing 24 containing the relay lens assembly with respect to the projector and the rigidly mounted tube 22 and projection lens housing 20. This structure also permits the lens system to be modified to accommodate various film formats by simply replacing the relay lens when the film format is changed.

In order to achieve certain special effects in a planetarium atmospherium presentation, it is often desirable to reduce the brightness or to fade the projected image. This is accomplished by reducing the light transmissiveness of the lens system. In a camera or taking lens, this reduction is generally accomplished by providing an iris in the lens system to stop down the lens system. However, in a projection lens such an iris would tend to focus the light source when the iris is stopped down to a small diameter. This focusing caused by the pin hole effect would cause an image of the light source to be projected onto the screen. Accordingly, instead of a fader of the iris type, the lens system according to the present invention employs a hinged fader leaf 40 (FIGS. 7-9) that is pivoted about a shaft 42. The fader leaf 40 is rotatable over a range of rotation of approximately 45° about the shaft 42 as shown in FIG. 7. When the fader leaf 40 is positioned parallel to the wall of the housing 22, the fader is in the fully open position and permits the maximum amount of light to pass through the lens system. As the fader leaf 40 is rotated toward the 45° position (shown in phantom lines in FIG. 7) the fader leaf 40 gradually blocks ever increasing amounts of the light passing through the lens system until the 45° position is reached. At this point, all of the light is blocked.

In accordance with an important aspect of the invention, the fader leaf 40 is arranged to block all light when the leaf is positioned in the 45° position, rather than in a 90° position. This prevents undue heating of the lens elements, particularly lens elements X-XV in the relay lens when the fader is positioned in the fully blocking position. This is because any light reflected from the fader leaf 40 will be reflected toward the housing 22 of the lens system where it may be readily dissipated rather than being reflected back to the lens elements X-XV. This reflection of heat toward the housing rather than the relay lens avoids possible overheating and damage to the lens elements X-XV.

In a typical installation, such as would be encountered in a planetarium installation, the position of the fader leaf 40 is controlled remotely. In the present embodiment, the control of the fader leaf 40 is accomplished by a servo motor 44 which drives the shaft 42 by means of a second shaft 46 and a pair of beveled gears 48 and 50. The shaft 46 is coupled to the shaft 52 of the motor 44 by a coupling 54 that transmits rotary motion from the shaft 52 of the motor 44 to the shaft 46 in order to rotate the shaft 42 and fader leaf 40.

The motor 44 is a standard servo motor, and may be controlled in a conventional manner from an appropriate control board. However, the position of the fader leaf 40 must be sensed so that the direction of the motor 44 could be reversed when the fader 40 reaches either of its limits of travel. This sensing is provided by an elongated arm member 56 that is affixed to the shaft 46. The arm member 56 contacts a pair of limit switches 58 and 60 when the fader leaf 40 reaches either its fully open or fully closed position. Because a 2:1 reduction ratio is provided between the gears 48 and 50 in the present embodiment, the limit switches 58 and 60 are positioned to permit 90° rotation of the arm member 56; however, the switches 58 and 60 may be positioned anywhere consistent with the gear ratio of the gears 48 and 50.

Figure 10:
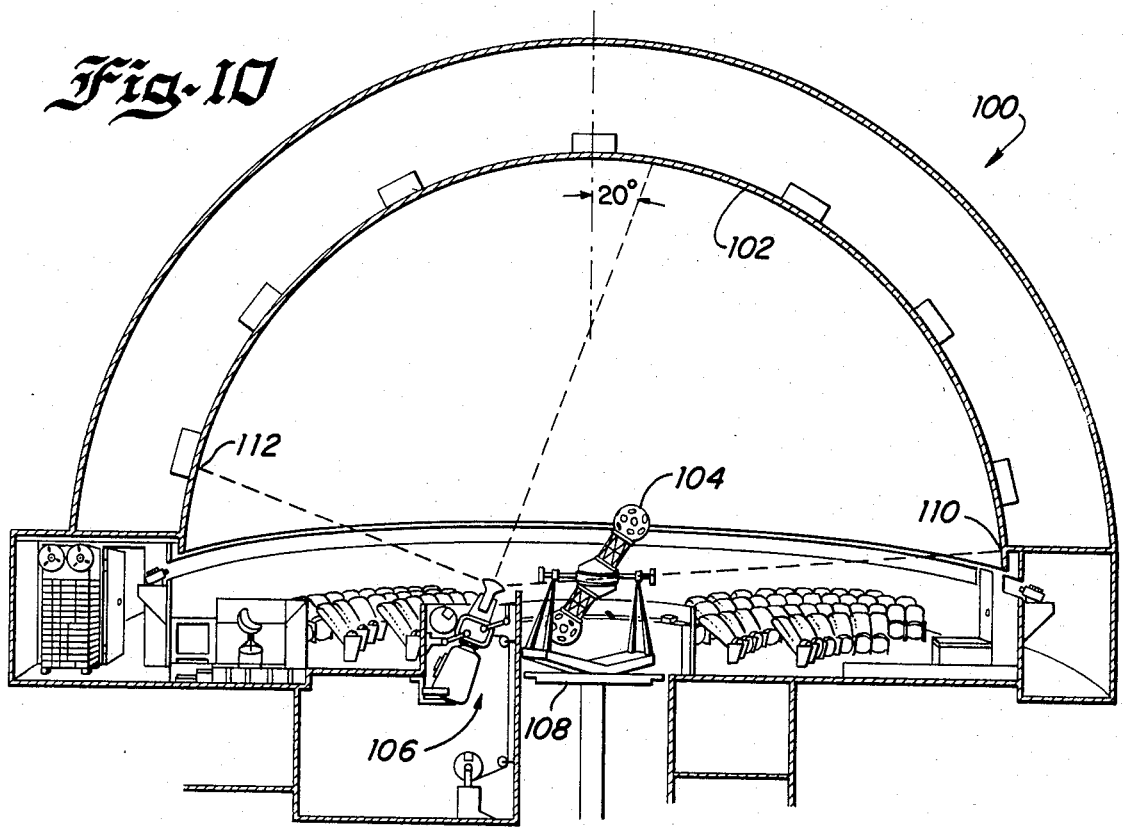
FIG. 10 is a side view of a planetarium illustrating a projection system utilizing the lens system according to the invention.
Figure 11:
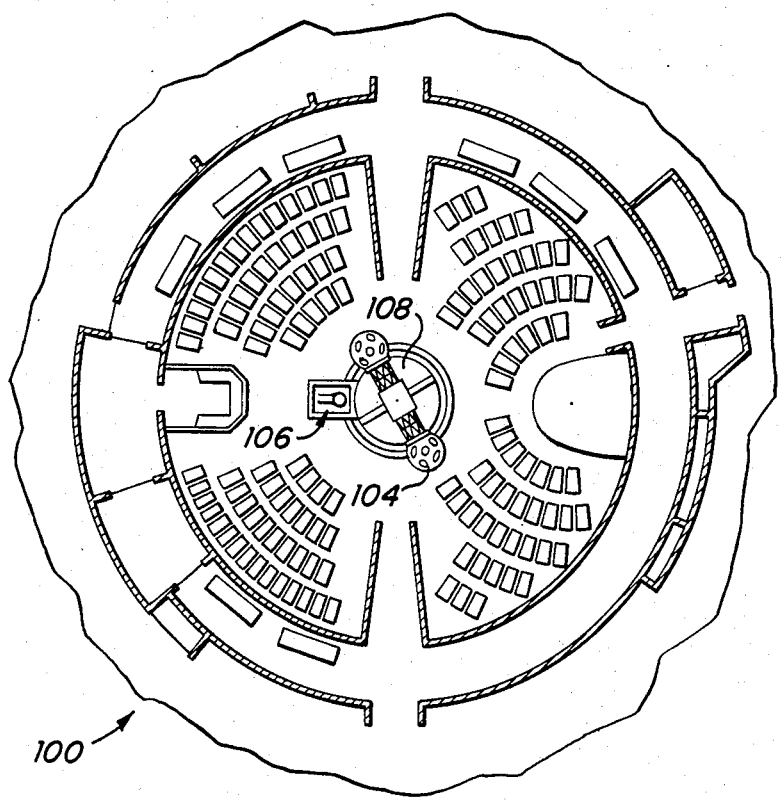
FIG. 11 is a top view of the planetarium illustrated in FIG. 10.

The lens system according to the present invention is particularly suitable for use as a projection lens for projecting moving picture images onto a planetarium dome. A typical installation of the lens system in a planetarium application is illustrated in FIGS. 10 and 11. A planetarium 100 having a projection dome 102 includes a planetarium projector 104 centrally mounted within the planetarium 100 and an atmospherium (movie) projector 106 mounted adjacent to the planetarium projector 104. The planetarium projector 104 is mounted on a platform 108 that can be hydraulically raised and lowered to permit the planetarium projector 104 to be raised and lowered.

Because the atmospherium projector is offset from the center of the planetarium dome 102, the projector and the projection lens are offset from the vertical position by 20°. The offsetting of the atmospherium projector 106 has the advantage that both the atmospherium projector 106 and the planetarium projector 104 can be operated simultaneously, thereby increasing the special effects that may be obtained. In addition, the offset in the projection angle reduces the angle between the longitudinal axis of the lens system and the forward horizon 110 of the planetarium. This results in a sharper image at the forward horizon 110 at the expense of a slightly raised rear horizon 112. However, because the seats in the planetarium are arranged to face the forward horizon, the raised rear horizon is not objectionable. Furthermore, the use of a raised rear horizon reduces the amount of "backscatter" or light reflected from the back horizon to the forward horizon. This reflected light would otherwise tend to "wash out" the image near the forward horizon.

By orienting the fader leaf 40 (FIGS. 7-9) within the tube 22 so that the image at the rear horizon 112 is faded slightly before the entire image is faded, the amount of backscatter can be even further reduced. This is particularly advantageous when bright scenes are being shown, because fading the image, particularly near the back horizon 112, does not reduce the brightness to an objectionably low level, and such a fading can result in a substantial reduction in the washing out of the image, particularly near the forward horizon.

Figure 12:
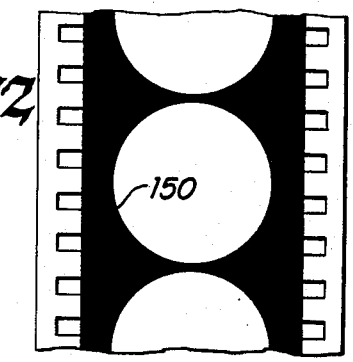
FIG. 12 illustrates a section of standard frame format 35mm film.

In accordance with another important aspect of the present invention, the movie projector used as the atmospherium projector 106 is basically a standard commercial quality 35mm motion picture projector, modified so that the frame advancing mechanism advances the film by five sprocket perforations rather than the standard four sprocket perforations normally used in cinematography. The advantage of advancing the film by five rather than four sprocket perforations per frame is illustrated in FIGS. 12 and 13. Referring to FIG. 12, the standard 35mm film format results in a rectangularly shaped frame that does not readily accommodate the circular format image that must be projected onto a hemispherical dome. As a result, when a standard format having four perforations per frame is used, the size of the circular image must be reduced so that the diameter of the image 150 is smaller than the shortest dimension of the frame. This results in an image having a diameter of approximately 11/16 inch, and results in a great deal of unused film area between the image 150 and the edges of the sprocket perforations. By modifying the frame advancing mechanism of the projector such that the film is advanced by five sprocket perforations for each frame, a substantially square frame results. This permits the image 152 to be increased in size so that substantially the entire frame area is occupied by the image 152 and results in much greater resolution of the projected image.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A fisheye lens system having the design parameters, normalized for an 8mm focal length, $F_8$, represented in the following table:

| ELEMENT | $n_d$ | $\nu$ | RADIUS | THICKNESS | SEPARATION |
|---|---|---|---|---|---|
| I | 1.607 | 56.7 | $R_1 = 8.853$ $R_2 = 1.181$ | $t_1 = .220$ | $S_1 = 1.037$ |
| II | 1.607 | 56.7 | $R_3 = 4.463$ $R_4 = 1.181$ | $t_2 = .150$ | $S_2 = 1.486$ |
| III | 1.620 | 36.4 | $R_5 = 5.798$ $R_6 = 3.308$ | $t_3 = .300$ | $S_3 = 1.062$ |
| IV | 1.620 | 36.4 | $R_7 = 6.869$ $R_8 = 2.536$ | $t_4 = .150$ | $S_4 = .100$ |
| V | 1.607 | 56.7 | $R_9 = 2.018$ $R_{10} = 2.638$ | $t_5 = .500$ | $S_5 = .100$ |
| VI | 1.607 | 56.7 | $R_{11} = 6.440$ $R_{12} = 1.309$ | $t_6 = .550$ | $S_6 = .100$ |
| VII | 1.755 | 27.6 | $R_{13} = 1.113$ $R_{14} = 4.728$ | $t_7 = .150$ | | wherein the Roman numerals I-VII identify the respective lens element from the long conjugate side to the short conjugate side, $n_d$ is the refractive index; $\nu_d$ is the dispersion number, $R_1$-$R_{14}$ represent the radii of successive surfaces from the long conjugate side to the short conjugate side, and $t_1$-$t_7$ and $S_1$-$S_6$ represent the thicknesses of lens element and air spaces, respectively, from the long conjugate side to the short conjugate side, with all dimensions being expressed in inches, and wherein the design parameters may be renormalized to any other focal length, $F_n$, by multiplying each of the surface radii, thicknesses and air spaces by the ratio $F_n/F_8$.

2. A fisheye lens system as recited in claim 1 further including lens elements having the design parameters represented in the following table:

| Element | $n_d$ | $\nu$ | Radius | Thickness | Separation |
|---|---|---|---|---|---|
| VIII | 1.607 | 56.7 | $R_{15}$ = PLANO $R_{16} = 5.002$ $K = -7.32$ | $t_8 = .750$ | $S_7 = 2.409$ |
| IX | 1.620 | 36.4 | $R_{17} = 5.002$ $R_{18}$ = PLANO | $t_9 = .750$ | $S_8 = 1.253$ | wherein VII-IX identify two additional lens elements added in sequence from the long conjugate side to the short conjugate side, $R_{15}$-$R_{18}$ represent the radii of successive surfaces of the additional lens elements from the long conjugate side to the short conjugate side, $t_8$-$t_9$ and $S_7$-$S_8$ represent the thicknesses of the additional lens elements and air spaces, respectively from the long conjugate side to the short conjugate side, and K represents the asphericity constant with which the surface shape is defined by the equation $$Z - \frac{Y^2 + (K + 1) Z^2}{2R} = 0$$

where
R = radius of curvature
Y = zonal radius of the surface
Z = axial departure from flatness 3. A fisheye lens system as recited in claim 2 further including a focused iris disposed between elements VIII and IX.

4. A fisheye lens system as recited in claim 2 further including lens elements having the design parameters represented in the following table:

| Element | $n_d$ | $\nu$ | Radius | Thickness | Separation |
|---|---|---|---|---|---|
| X | 1.607 | 56.7 | $R_{19} = 2.127$ $R_{20} = 35.712$ | $t_{10} = .6450$ | $S_9 = 20.087$ NOMINAL |
| XI | 1.607 | 56.7 | $R_{21} = 1.909$ $R_{22} = 4.288$ | $t_{11} = .6648$ | $S_{10} = .008$ |
| XII | 1.755 | 27.6 | $R_{23} = 13.018$ $R_{24} = 1.212$ | $t_{12} = .1400$ | $S_{11} = .140$ |
| XIII | 1.620 | 36.4 | $R_{25} = 1.212$ $R_{26} = 2.071$ | $t_{13} = .1400$ | $S_{12} = 1.066$ |
| XIV | 1.607 | 56.7 | $R_{27} = 4.809$ $R_{28} = 1.997$ | $t_{14} = .6066$ | $S_{13} = .070$ |
| XV | 1.607 | 56.7 | $R_{29} = 5.718$ $R_{30} = 5.718$ | $t_{15} = .5450$ | $S_{14} = .144$ | wherein X-XV identify six additional respective lens elements forming a relay lens system added in sequence from the long conjugate side to the short conjugate side, $R_{19}$-$R_{30}$ represent the radii of successive surfaces of the additional lens elements from the long conjugate side to the short conjugate side, and $t_{10}$-$t_{15}$ and $S_9$-$S_{14}$ represent the thicknesses of the additional lens elements and air spaces, respectively, from the long conjugate side to the short conjugate side.

5. A fisheye lens system as recited in claim 4 further including a pivotably mounted fader leaf disposed between elements IX and X.

6. A fisheye lens system as recited in claim 5 wherein said fader leaf is movable over a limited range of rotation from a first position substantially parallel to the longitudinal axis of the lens system to a second position substantially at a 45° angle to the longitudinal axis of the lens.

7. A fisheye lens system as recited in claim 4 further including means for supporting said lens system at an angle displaced approximately 20° from the vertical.

8. A fisheye lens system as recited in claim 7 wherein said supporting means includes a projector.

9. A fisheye lens system as recited in claim 8 wherein said projector includes means for positioning a circular image having a diameter of approximately 23mm in a focal plane adjacent the element XV.

10. A fisheye lens system as recited in claim 9 wherein said projector is a 35mm motion picture projector.

* * * * *